March 5, 1957     P. F. ROSSMANN     2,783,627
RESILIENT COUPLING FOR SERVOMECHANISM CONTROL
Filed Sept. 14, 1954
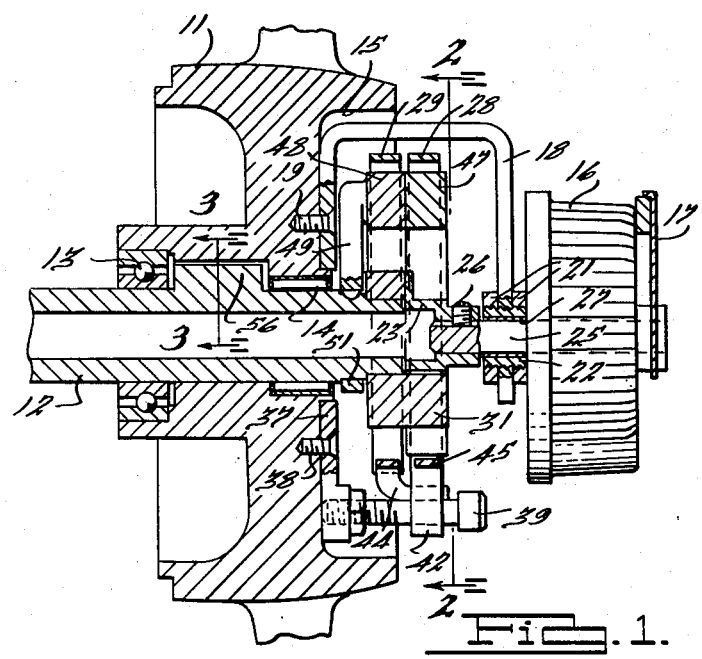
INVENTOR.
Peter F. Rossmann.
BY
Harness, Dickey & Pierce.
ATTORNEYS.

United States Patent Office 2,783,627
Patented Mar. 5, 1957

2,783,627

RESILIENT COUPLING FOR SERVOMECHANISM CONTROL

Peter F. Rossmann, Grosse Pointe Farms, Mich., assignor to Hupp Corporation, Cleveland, Ohio, a corporation of Virginia Application September 14, 1954, Serial No. 455,977

4 Claims. (Cl. 64—27)

This invention relates to resilient couplings, and more particularly to a spring arrangement for use in power steering mechanism control units and controls for similar servomechanisms. This application is related to copending applications Nos. 383,041 and 433,647, filed September 29, 1953 and June 1, 1954 respectively by Stanford R. Ovshinsky and assigned to the assignee of the present application.

In any servomechanism of the closed loop type it is necessary to damp out undesirable oscillations that may feed back and cause the actions of the mechanism to be too severe. In the case of power steering mechanisms such as are disclosed in the above two applications, springs or other resilient elements are used to transmit torque between the manually operated member and the driven member such as a steering shaft. It is desirable that undesirable oscillations in this resilient coupling be damped to avoid sudden momentary changes in the electrical control system which might cause erratic power assist to the vehicle wheels. Ordinary springs, whether of a torsion, compression or other type have natural periods of vibration which may cause oscillations if damping is not provided.

It is an object of the present invention to provide an improved resilient coupling for use in power steering mechanisms and similar servomechanisms which will minimize undesirable oscillations and thus insure the smooth control of the servomechanism throughout its entire range of operation.

It is another object to provide an improved resilient coupling of this type which utilizes torsion or cantilever type springs and which provides novel means for damping such springs to prevent undesirable oscillations.

It is also an object to provide an improved resilient coupling having the above characteristics, in which the novel damping means is easily installed, is of compact and dependable construction and is inexpensive to fabricate.

Other objects, features, and advantages of the present invention will become apparent from the subsequent description, taken in conjunction with the accompanying drawings.

In the drawings:

Figure 1 is a cross-sectional view in elevation taken along the line 1—1 of Figure 2 and showing a steering wheel hub and steering shaft with the improved resilient coupling of this invention, together with a control rheostat for the power steering mechanism;

Figure 2 is a front elevational view of a portion of the mechanism of Figure 1 taken in cross section along the line 2—2 of Figure 1 and showing the configuration of one of the damping cams, the other cam being omitted for purposes of clarity; and Figure 3 is a fragmentary cross-sectional view taken along the line 3—3 of Figure 1 and showing the lost motion safety connection between the steering wheel and steering shaft.

The flexible coupling is shown as mounted between a hub 11 of a vehicle steering wheel and a steering shaft 12. It will be understood however that the novel coupling may also be applied between other parts and for other uses than that shown, within the scope of the invention. Hub 11 is rotatably mounted on shaft 12 by means of anti-friction bearings 13 and 14. The outer end of hub 11 is provided with a circular recess 15 to accommodate the resilient coupling as will be later described. A sliding contact rheostat 16 of a circular type is rigidly secured to hub 11, and the sliding contact 17 thereof is secured to shaft 12 and moves therewith. The rheostat 16 and its contact arm 17 may be connected by electrical conduits (not shown) to the electromagnetic clutches of a power steering mechanism such as those shown in the aforementioned applications. It is not necessary for purposes of the invention that the rheostat and contact arm be of the type shown; any similar control unit for use in the electrical circuit of a servomechanism may be present.

In the illustrated embodiment, rheostat 16 is secured to hub 11 by means of a U-shaped bracket 18, one leg of which is secured to hub 11 by fasteners 19. The other leg of bracket 18 is secured by nuts 21 to a threaded nipple 22 which extends from rheostat 16. Steering shaft 12 has a connecting member 23 secured to the rear end thereof by fasteners 24 in a manner later described in detail. A contact arm shaft 25 is secured to connecting member 23 by a set screw 26 which allows axial adjustment thereof, and the outer end of shaft 25 has contact arm 17 secured thereto. A bushing 27 is disposed between nipple 22 and shaft 25. It will therefore be seen that rheostat 16 will follow the movements of steering wheel hub 11, while contact arm 17 will move with steering shaft 12. Any angular displacement between the hub and shaft, as determined by forces exerted on them and the resilient coupling, will result in equivalent angular displacement between rheostat 16 and contact arm 17.

The resilient coupling between the steering wheel and steering shaft comprises a pair of torsion or cantilever springs 28 and 29 which are so arranged as to resist relative movement of the wheel and shaft in opposite directions. Each spring is of substantially circular flat shape and is disposed approximately concentrically with the axis of shaft 12, the springs being alongside each other and partially within hub recess 15. Means are provided for securing one end of each spring to the steering shaft. In the present embodiment, this means comprises a securing bracket 31 which is mounted on the end of steering shaft 12 and secured thereto by a set screw 32. Connecting member 23 is secured to the end surface of bracket 31 by fasteners 24. The bracket has a pair of slots 33 and 34 within which one end of each spring is secured. In particular, end 35 of spring 28 is secured in slot 33 (spring 29 is not fully visible in Figure 2 because it is behind spring 28), and end 36 of spring 29 is secured within slot 34. Ends 35 and 36 of the springs are bent inwardly for securing purposes, as seen in Figure 2. The springs extend in opposite directions from their securing points on bracket 31, spring 28 extending clockwise as seen in Figure 2 and spring 29 extending counterclockwise.

Means are provided for connecting the opposite ends of the springs to the steering wheel so that relative angular movement of the wheel and shaft in one direction will cause spring 28 to wind, and relative movement in the opposite direction will wind spring 29. This means comprises a bracket 37 secured to hub 11 within recess 15 by fasteners 38. A pair of posts 39 and 41 are secured to bracket 37 and extend outwardly therefrom. The end of spring 28 adjacent post 39 has an outwardly hooked portion 42 which engages post 39. Likewise, the end of spring 29 adjacent post 41 has a hook-shaped portion 43 engaging this post. The connection between posts 39 and 41 and their adjacent spring ends are such that each post can cause winding of its spring but cannot deflect the spring in an unwinding direction. Thus, when hub 11 is turned clockwise from its central or neutral position in Figure 2 with bracket 31 held stationary, post 39 will tend to wind spring 28, deflecting it toward the dot-dash position shown. At the same time post 41 will move toward its dot-dash position away from hooked portion 43 of spring 29.

Means are provided for restraining the spring ends 42 and 43 against unwinding movement when their respective posts are moved in an unwinding direction. This means comprises a pair of restraining members 44 and 45. One end of restraining member 44 is secured within slot 33 of bracket 31, as seen in Figure 2, and one end of member 45 is secured within slot 34. The restraining members cross each other, and their outer ends engage ends 42 and 43 of the springs in such manner as to prevent the springs from unwinding beyond their neutral position as shown in Figure 2. It should be noted that restraining members 44 and 45 in no way interfere with the winding action of their respective springs under the influence of posts 39 and 41. Thus, when the steering wheel is turned in the clockwise direction with respect to steering shaft 12, it acts only upon spring 28 when turned beyond its neutral position. When turned counterclockwise from its neutral position, only spring 29 is wound while spring 28 remains stationary. Set screws 46 may be used to hold spring ends 35 and 36 and retaining members 44 and 45 in place.

As stated previously, means are provided for damping the oscillations of springs 28 and 29 so as to prevent erratic movement of rheostat 16 and contact arm 17. It will be appreciated that since hub 11 is freely rotatable on shaft 12 by means of bearings 13 and 14, the natural periods of vibration of springs 28 and 29 could cause unwanted oscillations of the steering wheel with respect to the shaft. This could be initiated, for example, if the steering wheel is "spun" by the operator or suddenly released so that no manual restraint is provided. In such cases, springs which are left free to oscillate with their natural periods of vibration could cause the steering wheel to rotate rapidly back and forth with respect to the shaft. Even if such oscillations are relatively small in magnitude with respect to the total movement of the steering wheel, their effect on the operation of the servomechanism, as determined by the instantaneous electrical values set up by rheostat 16 and contact arm 17, could well produce unsatisfactory power assistance.

The means for preventing such unwanted oscillations in the present embodiment of the invention comprise damping means for springs 28 and 29 which prevent continued natural vibrations of the springs by progressively diminishing the amplitude of such vibrations. More particularly, this is accomplished by progressively changing the effective length of each spring as it is deflected resulting in a variable rate spring which has a self-damping effect. Two similarly shaped abutments 47 and 48 are disposed adjacent springs 28 and 29 respectively. As seen in Figure 2, which shows only abutment 47 for reasons of clarity, the abutments are of crescent shape with their open ends facing the ends of the springs. Abutment 48, which cooperates with spring 29, is positioned symmetrically about a vertical axis with respect to abutment 47. The abutments are secured to each other by any suitable means, or may be made as an integral member, and are secured to steering shaft 12 by radial spokes 49 on a hub 51 keyed to shaft 12. Taking abutment 47 as an illustration, the outer surface 52 of this abutment is so shaped as to present a progressively increasing space 53 between this surface and spring 28 going in a clockwise direction in Figure 2, when the spring is in its neutral position. More particularly, the portion 54 of surface 52 adjacent end 35 of spring 28 engages the spring when the latter is in its neutral position. The space between abutment 47 and spring 28 is progressively larger in a clockwise direction, and is largest at end 55 of the abutment adjacent hooked end 42 of the spring. Abutment 48, although not visible in Figure 2, is similarly shaped with respect to spring 29. The end of abutment 48 adjacent end 36 of spring 29 is in engagement with the spring when the latter is in its neutral position. The space between abutment 48 and spring 29 is progressively larger in a counterclockwise direction as seen in Figure 2, the space being largest adjacent hooked end 43 of spring 29.

With this arrangement, it will be seen that winding of either spring from its neutral position will cause a progressively greater portion of the spring to engage its adjacent abutment. The effective length of the spring thus becomes progressively shorter as it is wound, and the natural period of vibration of the spring will vary accordingly. When the spring is being unwound, the reverse will happen, that is, its effective length will become progressively longer. The relative dimensions of the parts may be such that most or all of an abutment is engaged by its adjacent spring when it reaches its limiting position as described further below. The progressive change in the natural period of vibration of the spring as it is deflected will have a damping effect so that the spring vibrations will progressively diminish in amplitude if the springs are allowed to vibrate freely.

It should be noted at this point that the damping effect of abutments 47 and 48 does not interfere with the function of springs 28 and 29 as part of the servomechanism. As described more fully in the aforesaid copending applications, the resilient coupling between steering wheel 11 and steering shaft 12 serves to make the relative angular displacement of these two members proportional to the relative torques exerted on them. This ratio of displacement to torque may be linear or non-linear, the electrical characteristics of control elements 16 and 17 being chosen accordingly. In the present instance the fact that springs 28 and 29 vary in rate as they are wound means that a non-linear ratio will exist between torque and displacement, but this will not affect the usefulness of the flexible coupling as part of the servomechanism.

Safety means are provided for insuring a direct driving connection between hub 11 and steering shaft 12. This means is similar to that described in the aforesaid applications and provides for manual application of effort in excess of the amount available from the power assist unit. In the present embodiment, this safety lost motion connection is shown in Figures 1 and 3 and comprises a lug 56 extending outwardly from shaft 12 into a sector-shaped recess 57 in hub 11. Recess 57 is wider than lug 56 and permits angular displacement of the hub with respect to the shaft until the abutment engages the sides of the recess. It should be noted that even upon initial compression of springs 28, 29 manual steering effort is exerted directly on the steering shaft through these springs and that the lost motion connection becomes operative only when maximum spring deflection is attained.

In operation, assuming that hub 11 and shaft 12 are in their neutral position as shown in Figure 2, manual turning of hub 11 in a clockwise direction against resistance offered by shaft 12 will result in deflection of spring 28. This deflection will be produced by the engagement of post 39, secured to hub 11, with end 42 of spring 28, the opposite end 35 of this spring being secured to shaft 12 through bracket 31. As the spring is wound its effective length will be shortened by progressive contact with abutment 47. Contact arm 17 will move relative to rheostat 16 an amount equal to the relative angular displacement of shaft 12 and hub 11, thus controlling the power assist mechanism to provide power assistance proportional to the displacement. This power assistance will tend to bring the parts back to their neutral position, as explained more particularly in the aforementioned applications. As spring 28 is brought back to its neutral position its effective length will become progressively greater as it becomes disengaged from abutment 47. During the winding and unwinding movement of spring 28, spring 29 will be prevented from unwinding by restraining member 45, so that post 41 will simply move away from end 43 of spring 29.

During this movement of the parts, should spring 28 at any time be permitted free vibratory movement, for example by sudden release of the steering wheel by the operator, this vibration will be damped by the action of abutment 47 which continuously changes the rate of spring 28 as it vibrates. The vibrations will thus be progressively diminished in amplitude and undesired oscillations of control elements 16 and 17 will be prevented. A similar situation will obtain with respect to spring 29 and its abutment 48. The resulting power assistance to the steering linkage will be free from erratic fluctuations while still being responsive to the operator's needs.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a device of the class described, a driving member, a driven member, a pair of leaf type springs connecting said members, one of said springs being adapted to transmit force when the driving member is moved from a neutral position in one direction, the other spring being adapted to transmit force when the driving member is moved from said neutral position in the opposite direction, an abutment adjacent each of said springs, each abutment having a surface closely adjacent one end of its corresponding spring and progressively farther away from the remainder of said spring when said members are in their neutral position, relative movement of said members from their neutral position causing the force-transmitting spring to engage progressively larger areas of its corresponding abutment surface whereby the rate of said spring is progressively varied.

2. In combination, a rotary driving member, a rotary driven member coaxial therewith, a pair of springs connecting said driving and driven members, said springs being of a curved leaf type, one end of each spring being connected solely to said driving member, the other end of each spring being connected solely to said driven member, said connections being such as to cause said springs alternately to transmit forces from said driving member to said driven member in opposite directions, and a pair of curved abutments adjacent said springs, each abutment being closely adjacent one end of its corresponding spring and a progressively greater distance from the remainder of said spring, whereby deflection of either spring causes the effective length of such spring to be progressively varied.

3. In combination, a rotary driving member, a rotary driven member coaxial therewith, a pair of curved leaf type springs connecting said members, one end of each spring being secured solely to one of said members, said springs extending in opposite directions from said connections, the opposite ends of said springs having one-way connections solely to the other of said members whereby said springs may be alternately wound during relative movement of said driving and driven members in opposite directions, restraining means for preventing unwinding movement of said springs from said neutral position, and damping means for said springs comprising a pair of curved abutments adjacent said springs, each abutment being closely adjacent one end of its corresponding spring and progressively further away from the remainder of said spring, whereby deflection of each spring causes a variation in the effective length of said spring.

4. In combination, a rotary driving member, a rotary driven member coaxial therewith, said driving member being supported for rotational movement on said driven member, a pair of loop-shaped cantilever springs connecting said members, one end of each spring being secured solely to said driven member, the other end of each spring having a one-way connection solely with said driving member whereby said springs may be alternately wound when the driving member is moved in opposite directions from a neutral position with respect to the driven member, restraining means for preventing unwinding movement of said springs from said neutral position, and damping means for said springs comprising a pair of curved abutments mounted on said driven member and surrounded by said springs, each abutment being closely adjacent that end of its corresponding spring which is secured to said driven member, the abutment being spaced progressively further away from the remainder of said spring whereby the effective length of said spring is varied during its deflection.

References Cited in the file of this patent
UNITED STATES PATENTS

| | | |
|---|---|---|
| 1,729,435 | Bethel | Sept. 24, 1929 |
| 1,735,105 | Bethel | Nov. 12, 1929 |